US010674347B2

(12) United States Patent
Dowlatkhah et al.

(10) Patent No.: US 10,674,347 B2
(45) **Date of Patent: *Jun. 2, 2020**

(54) GLOBAL-TO-LOCAL PROFILE CONTROLLER SYSTEM AND METHOD

(71) Applicant: AT&T Intellectual Property I, L.P., Atlanta, GA (US)

(72) Inventors: Sangar Dowlatkhah, Alpharetta, GA (US); Venson Shaw, Kirkland, WA (US); Richard Schmidt, Milton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,241

(22) Filed: Sep. 17, 2019

(65) Prior Publication Data

US 2020/0015065 A1 Jan. 9, 2020

Related U.S. Application Data

(63) Continuation of application No. 15/351,901, filed on Nov. 15, 2016.

(51) Int. Cl.

| | |
|---|---|
| ***H04W 8/08*** | (2009.01) |
| ***H04W 8/04*** | (2009.01) |
| ***H04W 8/18*** | (2009.01) |
| *H04W 64/00* | (2009.01) |

(Continued)

(52) U.S. Cl.

CPC ............... *H04W 8/04* (2013.01); *H04W 8/18* (2013.01); *H04W 8/082* (2013.01); *H04W 60/04* (2013.01); *H04W 60/06* (2013.01); *H04W 64/006* (2013.01)

(58) Field of Classification Search

CPC ..... H04W 8/04; H04W 64/006; H04W 60/06; H04W 60/04; H04W 8/082

See application file for complete search history.

(56) References Cited

U.S. PATENT DOCUMENTS

| | | | |
|---|---|---|---|
| 6,088,598 | A | 7/2000 | Marsolais |
| 7,155,226 | B1 | 12/2006 | Oh et al. |
| 9,294,337 | B2 | 3/2016 | Bollapalli et al. |

(Continued)

FOREIGN PATENT DOCUMENTS

| | | |
|---|---|---|
| CN | 100354857 C | 12/2007 |

*Primary Examiner* — Joseph E Dean, Jr.

(74) *Attorney, Agent, or Firm* — Guntin & Gust, PLC; Andrew Gust

(57) ABSTRACT

Aspects of the subject disclosure may include, for example, associating a global-to-local network profile with a user profile of a first communications network and detecting a number of local networks managed separately from the first communications network. The local networks include local user profiles, wherein access to resources of a local network is based on credentials available by way of a local user profile associated with the user. A location of the user is determined and a proximity of the user to a first local network is determined based on the location of the user. Information is transferred between the global-to-local network profile and a local user profile based on the proximity of the user to the first local network, wherein the transferring of the information supports a registration status of the user with the first local network of the plurality of local networks. Other embodiments are disclosed.

20 Claims, 7 Drawing Sheets

(51) Int. Cl.
*H04W 60/04* (2009.01)
*H04W 60/06* (2009.01)

(56) References Cited

U.S. PATENT DOCUMENTS

| | | | | |
|---|---|---|---|---|
| 9,401,908 | B1 | 7/2016 | Strand et al. | |
| 9,414,225 | B2 | 8/2016 | Timariu et al. | |
| 2011/0269461 | A1 | 11/2011 | Xu et al. | |
| 2011/0269472 | A1 | 11/2011 | Xu et al. | |
| 2014/0066018 | A1* | 3/2014 | Zhu | H04W 4/021 455/411 |
| 2015/0142879 | A1 | 5/2015 | Rameil-Green | |
| 2015/0188843 | A1 | 7/2015 | Chauhan et al. | |
| 2015/0200946 | A1 | 7/2015 | Horn et al. | |
| 2015/0264051 | A1 | 9/2015 | Hoggan | |
| 2015/0280765 | A1 | 10/2015 | Lowery | |
| 2016/0119788 | A1 | 4/2016 | Mandyam et al. | |
| 2016/0142467 | A1 | 5/2016 | Ban et al. | |
| 2016/0162783 | A1 | 6/2016 | Tan et al. | |
| 2018/0139601 | A1 | 5/2018 | Dowlatkhah et al. | |

* cited by examiner

200

300

400

SHO
411
SHS
410
430
462
VHO 1
VHO 2
ISP Network 432
VHO 3
VHO 6
Mobile Network 474
412
VHO 4
VHO 5
414
417
VHS
418
ACCESS NETWORK
429
415
465
463
470
472
419
Satellite dish receiver 431
408
466
STB 406
G 404
Ctrl 407
ISP Ntwk 432
416
STB 406
Cable TV 433
464
402
408
Remote Services

GLOBAL-TO-LOCAL PROFILE CONTROLLER SYSTEM AND METHOD

CROSS REFERENCE TO RELATED APPLICATIONS

This application is a continuation of U.S. patent application Ser. No. 15/351,901 filed Nov. 15, 2016, pending. All sections of the aforementioned application are incorporated herein by reference in their entirety.

FIELD OF THE DISCLOSURE

The subject disclosure relates to a global-to-local profile controller system and method.

BACKGROUND

Mobile cellular networks, such as LTE networks, provide superior speed and performance for delivering a wide range of products and service to large numbers of mobile subscribers. Traditional mobile cellular networks generally represent wide area networks that support delivery of network services to large numbers of users over vast geographic regions. Mobile cellular networks also generally operate in a limited number of available radio frequency spectra. Subscribers typically pay a premium for delivery of services over the limited RF resources.

Users, including mobile users have access to network resources over greater and greater numbers of local networks that typically serve a limited number of users over a limited geographical region. Examples of such local networks include personal networks, home networks, connected device networks, and transportation platform networks, such as local networks on cars, trains, busses, ships and planes. Still other examples can include local networks available at places of work, shopping venues, sports arenas and stadiums, recreational venues and the like.

In at least some instances, one or more local networks can be used by service providers and/or subscribers to offload traditional cellular traffic thereby freeing up RF spectra, often at a savings to the subscriber. Access to one or more local networks can be open, e.g., available to the general public, or restricted to at least some degree, e.g., based on subscription, authorization, availability and the like.

Mobile networks, such as LTE networks, typically include a host Central Network Repository (CNR), or Home Local Register (HLR), and/or Home Subscriber Server (HSS) platform which retains the user profile for its entire customer base. Local networks representing day-to-day activities of subscribers may or may not include local subscriber profiles. Nevertheless, operations of the local networks generally occur without coordination and/or insight by the service providers.

BRIEF DESCRIPTION OF THE DRAWINGS

Reference will now be made to the accompanying drawings, which are not necessarily drawn to scale, and wherein.

DETAILED DESCRIPTION

Figure 1:
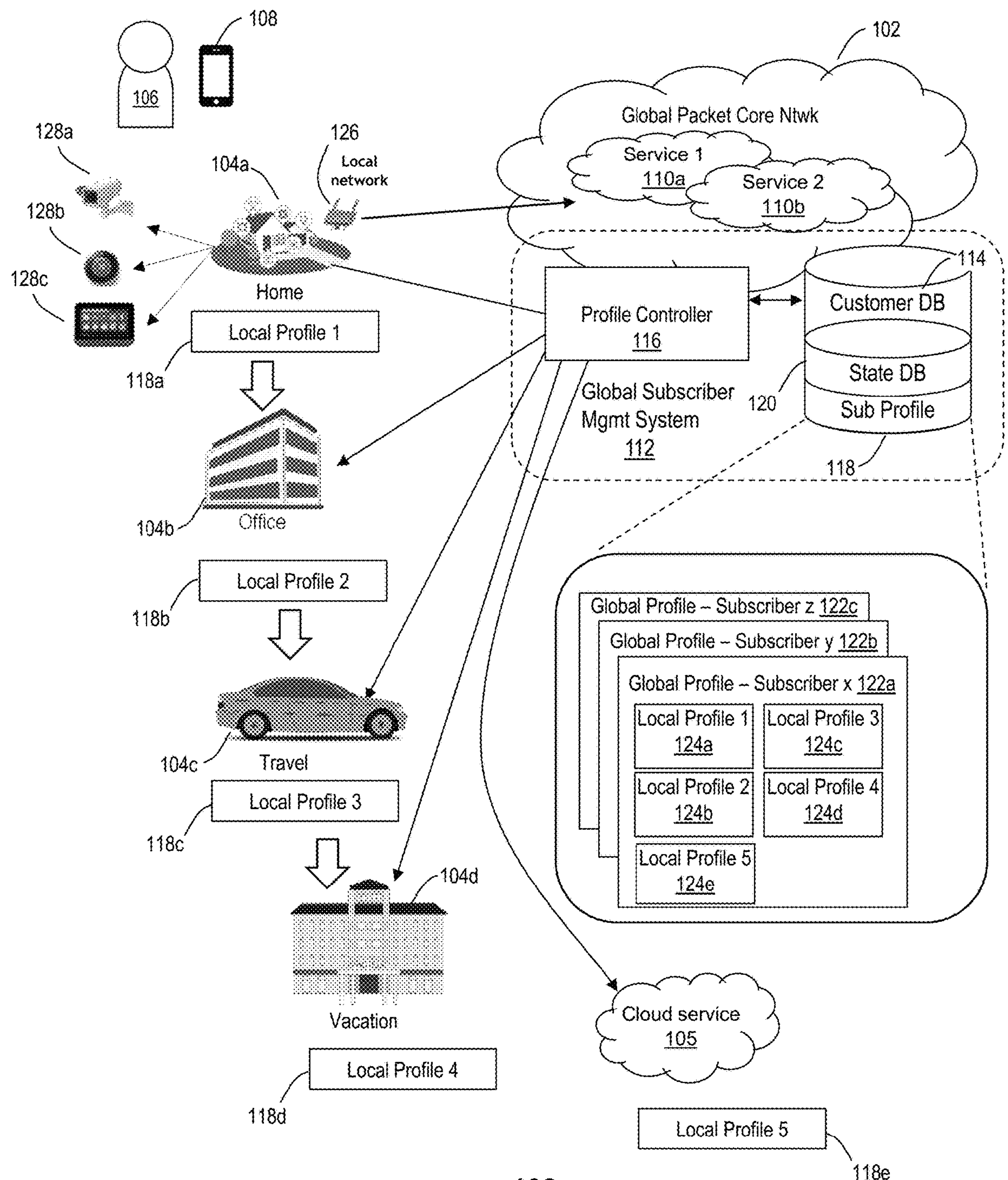
FIG. 1 depicts an illustrative embodiment of a communication system that provides a profile controller.

The subject disclosure describes, among other things, illustrative embodiments for allowing a global network, such as a service provider network, to engage with local networks to gather insight into behaviors and/or activities of global network subscribers when engaging in activities of the local networks. Such insight into subscriber activities beyond the service provider network is believed to present significant opportunities for the service provider to develop, advertise and/or deliver products and/or services to the subscriber. Other embodiments are described in the subject disclosure.

One or more aspects of the subject disclosure include a device, including a processing system having a processor and a memory that stores executable instructions that, when executed by the processing system, facilitate performance of operations. The operations include associating a global-to-local network profile with a global subscriber profile of a first wide area communications network. A service provider maintains a global subscriber profile repository that includes the global subscriber profile of a subscribing user of a number of subscribing users. Local networks are identified that are managed separately from the first wide area communications network, wherein the local networks include local subscriber profiles, and wherein access to resources of one of the local networks by equipment of the subscribing user is based on credentials available by way of a local subscriber profile associated with the subscribing user. A location of the subscribing user is identified and a proximity of the subscribing user to a first local network is calculated based on the location of the subscribing user. Information is exchanged between the global-to-local network profile and a local subscriber profile associated with the subscribing user and the first local network based on the proximity of the subscribing user to the first local network, wherein the exchanging of the information supports a registration status of the subscribing user with the first local network.

One or more aspects of the subject disclosure include a process, comprising associating, by a processing system including a processor, a global-to-local network profile with a subscriber profile of a first communications network, wherein a service provider maintains a subscriber profile repository that includes the subscriber profile of a subscribing user. A number of local networks are detected that are managed separately from the first communications network, wherein the number of local networks include local subscriber profiles. Access to resources of a local network by equipment of the subscribing user is based on credentials available by way of a local subscriber profile associated with the subscribing user. A location of the subscribing user is determined along with a proximity of the subscribing user to a first local network of the number of local networks based on the location of the subscribing user. Information is transferred between the global-to-local network profile and the local subscriber profile associated with the subscribing user and the first local network based on the proximity of the subscribing user to the first local network, wherein the transferring of the information supports a registration status of the subscribing user with the first local network of the plurality of local networks.

One or more aspects of the subject disclosure include a machine-readable storage medium, including executable instructions that, when executed by a processing system including a processor, facilitate performance of operations. The operations include associating a global-to-local network profile with a user profile of a first communications network, wherein a service provider maintains a user profile repository that includes the user profile. Local networks are identified that are managed separately from the first communications network, wherein the local networks include a number of local user profiles. Access to resources of a local network by equipment of the user is based on credentials being made available by way of a local user profile associated with the user. A location of the user is determined along with a proximity of the user to a first one of the local networks based on the location of the user. Information is transferred between the global-to-local network profile and a local user profile associated with the user and the first local network based on the proximity of the user to the first local network, wherein the transferring of the information supports a registration status of the user with the first local network.

FIG. 1 depicts an illustrative embodiment of a communication system 100 that provides a profile controller. The system includes a packet core network 102, sometimes referred to as a global packet core network 102, and a number of local networks. By way of illustration and without limitation, examples of local networks include a home network 104*a*, an office network 104*b*, a travel network 104*c*, and a vacation network 104*d*, generally 104. A user 106 can access network services by way of to one or more of the local networks 104. Alternatively, or in addition the user 106 can access network services by the global packet core network 102.

In at least some examples, the user accesses network services using a mobile device 108. Examples of mobile devices include, without limitation, a mobile phone, sometimes referred to as a smart phone, a tablet device, a laptop computer, a personal data assistant, a media processor or player, an electronical game controller and/or console, a vehicle, e.g., a car, and the like. Alternatively, or in addition, the user 106 accesses network services through a stationary device. Examples of stationary devices include, without limitation, a desktop computer, a set-top box or media processor, a smart television, a video conferencing system, a home alarm system, an electronic game console, a telephone, a remote controller, such as a remote controller of a media processor or entertainment system, and the like.

It is understood that the user 106 can access one or more of the local networks 104 at a time. It is further understood that such access to one or more of the local networks can include wireless access technologies, such as wireless local area networks (WLANs), wireless personal area networks (WPANs), wireless metropolitan area networks (WMANs) and/or wireless wide area networks (WWANs). Examples of WLANs include, without limitation, IEEE 802.11 WLAN techniques, such as 802.11a/b/g (WiFi), 802.11n high-speed WLAN and the like. Likewise, examples of WPANs include, without limitation, IrDA and Bluetooth WPANs. Other examples include IEEE 802.15.4a (Zigbee) and 802.15.3c (UWB). Examples of WMANs include, without limitation, IEEE 802.16 broadband wireless access, commercialized under the name "WiMAX." Examples of WWANs include, without limitation, so called "2G" networks, "3G" networks, "4G" networks, "4G Advanced" networks, and currently planned "5G" networks and variants. Examples of 2G networks include e.g., GSM and IS-95, with extensions via GPRS, EGS and 1×RTT. Examples of 3G networks include, e.g., EV-DO, W-CDMA (including HSPA) providing combined circuit switched and packet switched data and voice services. Examples of 4G networks include, e.g., HSPA+, WIMAX and LTE, of which WIMAX and LTE include packet-based networks, without requiring traditional voice circuit capabilities.

In at least some embodiments, the local networks include or are otherwise associated with small-cell coverage. For example, one or more of the local networks 104 can include a femtocell and/or micro sell providing cellular wireless coverage, e.g., LTE or LTE-Advanced coverage, in a localized region within a vicinity of the cell. It is further envisioned that one or more of the local networks can include small cells that support anticipated "5G" coverage, e.g., operating within the appropriate allocated RF spectrum and subscribing to the appropriate protocols.

The user 106 accesses one or more network services 110*a*, 110*b*, generally 110, by way of the mobile device 108 and/or devices at one or more of the local networks 106. By way of illustrative example, services can be provided by a service provider network and/or via other packet networks including the Internet at large. Examples of services include, without limitation, voice, voice over IP (VoIP), short message service (SMS), multimedia message service (MMS), instant messaging (IM) email, teleconferencing, video conferencing, audio streaming, video streaming, web browsing, file transfer, and the like. It is understood that services 110 can be offered or otherwise hosted by the service provider, by a third party, and/or by a combination of the service provider and a third party. Other services can include, without limitation, home monitoring, Internet radio, Internet television, video on demand, video streaming, electronic gaming, newsfeeds, and the like.

It is understood that one or more of the services 110 can include applications. Applications can include client-server applications, e.g., in which the subscriber accesses the applications via a client running on user equipment, such as the mobile phone 108, smart TV, tablet device, laptop computer and the like. Alternatively, or in addition, the applications can include application software programs, e.g., "apps," resident on the user equipment. The apps may be downloaded or otherwise obtained from one or more ecosystems, such as the APP STORE® digital distribution platform, GOOGLE PLAY® digital media store, etc. APP STORE and GOOGLE PLAY are registered trademarks of Apple, Inc. and Google, Inc., respectively. Apps can include, without limitation, media apps, such as a streaming video app, a podcast app, and the like. Likewise, apps can include IM, ViOP and/or video chat, e.g., SKYPE® communication application. SKYPE is a registered trademark of Microsoft Corp. Alternatively, or in addition, apps can include games, utilities and/or social media apps, such as FACEBOOK®, TWITTER®, online social media and social networking services. FACEBOOK and TWITTER are registered trademarks of Facebook, Inc. and Twitter, Inc., respectively.

The system 100 also includes a subscriber management system. In the illustrative example, the subscriber management system is a global subscriber management system 112, e.g., managed and/or otherwise hosted by the global service provider. The global subscriber management system 112 includes at least one customer repository or database 114 and a profile controller 116. The example customer database 114 includes a collection of subscriber profiles, e.g., arranged in a subscriber profile repository or database 118. Alternatively, or in addition, the customer database 114 can include a state database 120.

The subscriber profile database 118 can include one or more subscriber profiles associated with each subscriber to services of the service provider. The subscriber profiles can include, without limitation, subscriber identity, authorization and/or security credentials, identification of level(s) of subscription and/or individual subscribed services or service packages, affinities, subscriber preferences, historical information, e.g., usage patterns, multimedia viewing patterns, and the like. In at least some embodiments, the subscriber profiles can include access and/or authorization credentials for one or more services. In at least some embodiments, the subscriber profile database 118 includes multiple personas associated with a common owner. Consider an individual that holds one persona as an employee, another as a family member, another associated with an affinity, such as a club or sport team, and the like.

The state database 120 can include information related to one or more states associated with the subscriber. States can include, without limitation a state of presence, e.g., "where the user is at any given time." Other state information can include state of connectivity, e.g., mobile phone 108 connected and active, idle etc. Still other state information can include states associated with one or more services and/or applications. Consider a user who is streaming a video on demand content item from a streaming service provider. The state database 120 can include indicia of the media deliver, such as the selected program, progress of the streaming of the content, and the like.

It is further envisioned that one or more of the subscriber profile 118 and the state database 120 can include historical information. Historical information can include, without limitation, user mobility over any given time period, user service and/or application usage. Billing information, equipment status, and the like. It is further envisioned that one or more of the subscriber profile 118 and/or the state database 120 can include statistical results of values, such as averages, e.g., of data usage, services/apps, location, and the like. In at least some embodiments, the customer database 114 can include statistical results obtained from observed information, such as probabilities of where the subscriber is located based on time of day, day of week, and the like.

In at least some embodiments one or more local profiles can be associated with the subscriber in relation to one or more of the local networks 104. For example, a first local subscriber profile 118*a* of the user 106 is associated with the home network 104*a*. Likewise, a second local subscriber profile 118*b* of the user 106 is associated with the office network 104*b*. A third local subscriber profile 118*c* is associated with the travel network 104*c* and a fourth local subscriber profile 118*d* is associated with the vacation network 104*d*. In some embodiments, another local profile, e.g., a fifth local subscriber profile 118*e* can be associated with a cloud network and/or cloud service provider, hereinafter, cloud 105. Yet another local subscriber profile can be associated with the user's mobile phone 108, e.g., when used as a private hotspot.

Local subscriber profiles, generally 118, may vary for any number of reasons. For example, a local subscriber profile can depend upon one or more of equipment available to the subscriber in association with the local network, communication modes and/or channels, user preferences, imposed restrictions, historical patterns, maintenance status, applicable fees for subscription, service and/or data volume and/or rate. For example, an employer may impose restrictions on certain apps, such as social media, video streaming, and the like for subscribers accessing the local network at the office 104*b*.

The profile controller 116 is in communication with the customer database 114 and/or one or more of the subscriber profile repository 118 and/or the state database 120. The profile controller 116 is also in communication with the global packet core network 102. It is understood that the global subscriber management system can be integrated with, collocated and/or otherwise associated with the packet core network 102. For example, when the global packet core network is operable in a 4G LTE, including LTE advanced network, the global subscriber management system 112 can be integrated with or otherwise in communication with one or more network elements of an evolved packet core of the 4G network.

Integration and/or interconnectivity with the evolved packet core of the global packet network 102 can provide the global subscriber management system 112 with information, such as an identity of the subscriber 106, access to information in a mobile subscriber profile repository, identification of user mobile equipment, e.g., IMSI and/or MAC addresses, subscriptions, account status, location of the user and/or associated user equipment, presence information related to the user, events associated with the user, the equipment of the user and/or applications and/or services accessed by the user, and the like.

The global subscriber management system 112, e.g., the profile controller 116, can identify one or more of a user location, whether the user is stationary or mobile, events associated with the user, user equipment, services and/or applications, session status including session updates and the like. In at least some embodiments, the profile controller 116 implements logic and/or rules based on such feedback from the global packet core network 102, including one or more of a location, an event, and/or a session update. For example, the global subscriber management system 112, e.g., the profile controller 116, is configured to automatically perform one or more actions in response to the location, event and/or session update.

A user's location can be determined by a mobile services provider 102, e.g., based on location reporting obtained from mobile devices of the user 106, such as the user's mobile phone 108. Mobile devices generally broadcast their location to allow mobile carriers to identify and/or manage communication services to subscribers and/or visitors within their wireless coverage areas.

By way of non-limiting example, in a first action responsive to a location, an event and/or a session update, the profile controller 116 can be configured to push a local profile to a local network 104 and/or cloud 105. For example, the subscriber profile 118 can include one or more global profiles 122*a*, 122*b*, 122*c*, generally 122, for each subscriber. It is envisioned that one or more of the global subscriber profiles 122 can include or otherwise be associated with one or more local profiles. In the illustrative example, a global profile 122*a* of subscriber x, is associated with the subscriber 106. The example global profile 122*a* includes five local profiles, sometimes referred to as global-to-local profiles. These profiles are associated with local networks but otherwise tracked, updated and/or maintained by a global service provider. The "global-to-local" designation distinguishes the globally stored local network profiles from network files stored in or otherwise maintained by the local network resources. A first global-to-local profile 124*a* is associated with the local home network 104*a*. A second global-to-local profile 124*b* is associated with the local office network 104*b*. A third global-to-local profile 124*c* is associated with the local travel network 104*c*, e.g., the subscriber's car. A fourth global-to-local profile 124*d* is associated with another local network 104*d*, such as a hotel, a resort, a retail outlet, a restaurant, a friend's home network and the like. A fifth global-to-local profile 124*e* is associated with another local network, such as a cloud service.

It is understood that not every physical local network visited or otherwise accessed by the subscriber 106 may have an associated local profile stored within the subscriber profile repository 118. For example, the global profile 122*a* may not have a global-to-local profile upon an initial visit to a vacation destination that provides a local, e.g., hotel guest network, a retail outlet, such as a shopping mall and the like.

In some embodiments, a global-to-local profile is automatically established by the profile controller in response to the user 106 accessing the new local network. Alternatively, or in addition, the user can be presented with a choice as to whether a global-to-local profile should be established or otherwise associated with the global profile 122 for the new local network. This choice can be presented in response to the user 106 accessing the new local network for a first time, or only after some predetermine number of subsequent accesses. In some embodiments, the user 106 can manually request that a local profile be established, and/or manually establish a local profile for an identified local network. Such requests and/or configurations can be accomplished, e.g., by a configuration app hosted on a user device, such as the mobile phone 108, and/or by way of a user portal to one or more of the global profile 122, the profile controller 116, the customer database 114, and the like.

Continuing with the illustrative example, the profile controller 116 can be configured to perform a second action responsive to a location, an event and/or a session update. The second action can include pushing and/or otherwise forwarding or providing a local profile to a local network 104 and/or cloud 105. For example, a particular local profile, such as the second global-to-local profile 124*b* can be pushed to a local profile 118*b* of the user's office local network 104*b*. This action can be undertaken, e.g., when the user's mobile phone 108 reports to the mobile carrier network 102 that the user is approaching or has otherwise reached their office. Alternatively or in addition, the action can be undertaken in response to other events, such as the user entering the office, scanning a user identification card or badge, e.g., using an RFID, bar code, QID, and/or near field reader, or the user's mobile device 108 accessing a wireless access point, e.g., a WiFi or small cell access point at the user's office. In some embodiments, the action can be undertaken by the user logging into their office's desktop device, and the like. Alternatively, or in addition, the action can be undertaken responsive to a manual acknowledgement by the user that they are at the office. This can be accomplished, e.g., by an updated user status, a social media status, and the like.

In some embodiments, the profile controller 116 can be configured to perform another action responsive to a location, an event and/or a session update that includes deregistering from a previous local network/cloud. For example, the user may be attached to or otherwise associated with a home local network 104*b* while at home. When the user leaves home, the user's mobile phone 108 reports to the mobile carrier network 102 that the user has moved away from or otherwise left their home. Upon a determination that the user has left home, the user can be deregistered from their office network. In at least some embodiments, deregistration can include storing an updated global-to-local profile 124, updating any metrics and/or statistics being tracked in association with the user's access of the local network.

In some embodiments, the profile controller 116 can be configured to register a current local network/cloud responsive to a location of the user and/or user's equipment, an event and/or a session update. Registration can be facilitated by digital items stored or otherwise retained in a global-to-local profile 124, such as authorization codes, usernames, passwords, pass phrases, encryption keys, and the like. Such registrations can include registration to access hardware items, such as wireless access points, computer systems and the like. Alternatively, or in addition, such registrations can include registration to access services and/or applications.

In some embodiments, the profile controller 116 can be configured to predict a local network and perform a preregistration in association with the predicted local network and/or cloud. Without limitation, such predictions can be based on one or more of a user's location, mobility, e.g., speed, acceleration, and/or direction or bearing. Alternatively or in addition, such predictions can be based on one or more of a user's schedule, e.g., the user's calendar showing an appointment at a particular location, a user's historical patterns, e.g., based on one or more of time of day and/or day of week weather, a user's request, and the like. In at least some embodiments, such predictions can be based on social media. For example, a user's location can be predicted based on one or more of plans, activities, and/or locations of social contacts of the user. Alternatively, or in addition, the predictions can be based on a scheduled event or program. For example, if the user has season tickets to a sports team, the user can be pre-registered for a corresponding sports venue, arena or stadium around the time of the scheduled event.

In at least some embodiments, such preregistrations can be followed by de-registrations. The de-registrations can be based on one or more factors, such as the user's actual location, e.g., the user does not attend a scheduled sporting event as determined by a reporting of a location of the user's mobile phone 108 away from the sporting venue at the time of the sporting event. A logic and/or rules can be implemented, e.g., to de-register after a predetermined time interval. The logic can extend or otherwise modify the time interval, e.g., based on tracking a user's location and determining that the user is most likely traveling to the sports venue, but stuck in traffic.

In some embodiments, the profile controller 116 can be configured to continuously monitor and update a user's global-to-local profile. For example, if a user shops at a mall and accesses a shopping mall local network for a first time, the profile controller 116 can automatically establish a corresponding local profile in the customer database 114. Alternatively, or in addition, if the user orders additional services, access other applications, changes usernames, passwords, passphrases, and the like, the profile controller 116 can detect such changes and be configured to update the global-to-local profile 124 accordingly.

Figure 2:
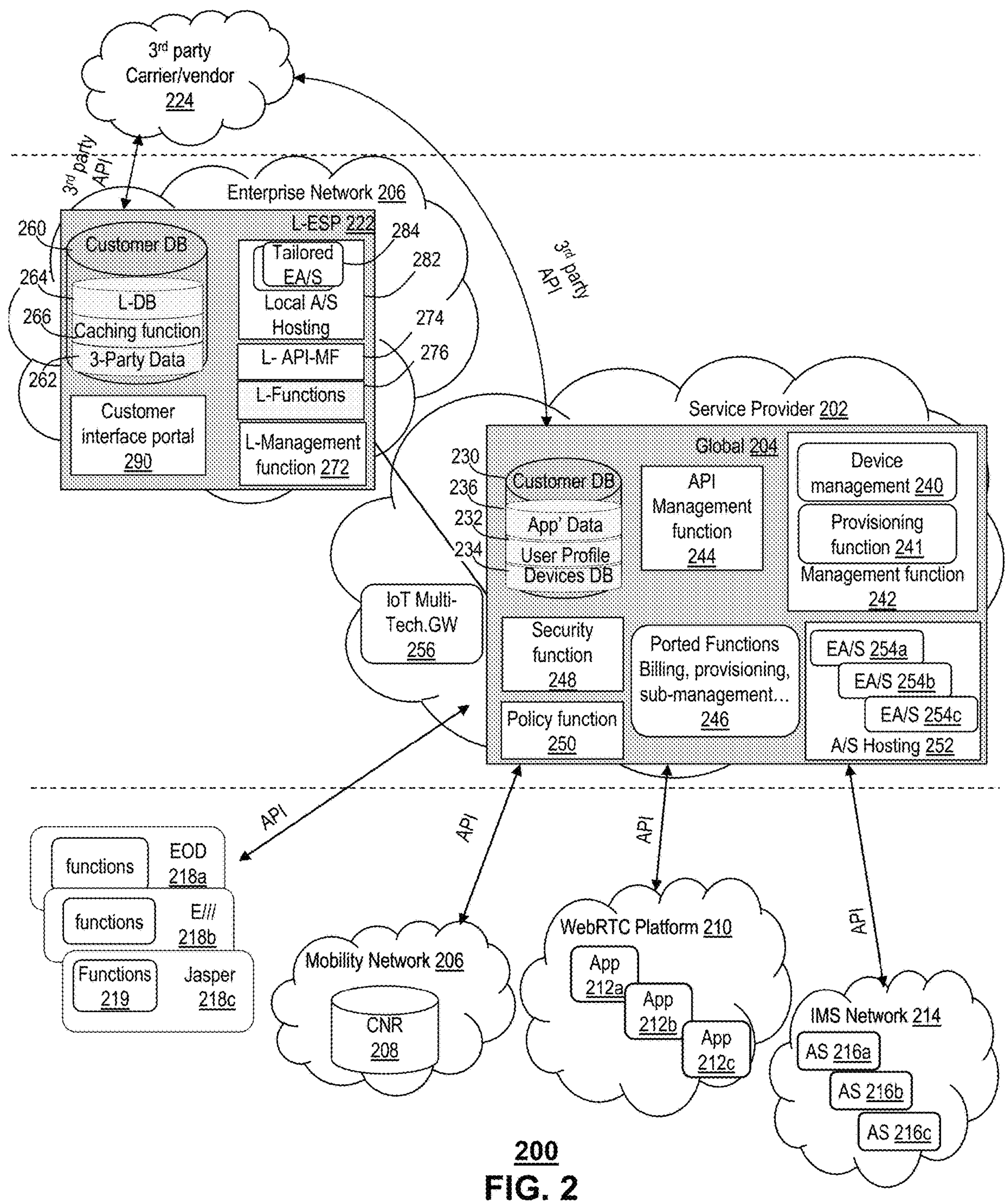
FIG. 2 depicts another illustrative embodiment of a communication system that provides a profile controller.

FIG. 2 depicts another illustrative embodiment of a communication system 200 that provides a profile controller. The communication system 200 includes a service provider network 202 that includes a global management system 204, that includes a customer repository or database 230 and a management function 242. The example customer database 230 includes an application data repository 236, a user profile repository 232 and a devices repository 234. The management function 242 includes a device management module 240 and a provisioning function module 241. The example global subscriber management system 204 also includes a security function 248, a policy function 250, ported functions, such as billing, provisioning, subscriber management and the like, an application/service (A/S) hosting function 252, and an application programming interface (API) management function 244. In the illustrative example, the A/S hosting function 252 includes a number of enterprise application services 254*a*, 254*b*, 254*c*.

The communication system 200 includes an example enterprise network 206. The example enterprise network includes a local enterprise management system 222, that includes a customer repository or database 260 and a local management function 272. The example customer database 260 includes a local user profile repository 264, a caching function 266 and a repository of third-party data 262. The local enterprise management system 222 also includes a local API management function 274, other local functions 276, a customer interface portal 290 and a local application/service hosting controller 282. The local application/service hosting controller can include one or more tailored enterprise applications and/or services 284. It is understood that the local enterprise management system 222 is communicatively coupled to the global management system 204.

It is understood that one or more of the global management function 242 and the local enterprise management functions 222 can be in communication with one or more other networks, e.g., including third party carrier networks 224, network accessible vendor resources, and the like. Examples of other carrier and/or service provider networks include a mobility network 206, a WebRTC platform 210, an IMS network 214 and one or more Internet of Things (IoT) services and/or functions 218*a*, 218*b*, 218*c*. To that end, the service provider network 202 can include an IoT gateway 256 to facilitate communications, management, reporting and general interactions with IP enabled devices.

It is understood further, that one or more of the global management function 242 and the local enterprise management functions 222 can include global-to-local features disclosed in the foregoing examples of FIG. 1. For example, one or more of the customer databases can store and/or otherwise manage global-to-local user profiles. Similarly, one or more of the management functions 242, 272 can be configured to facilitate management of global-to-local exchange of information, including transfer and/or updating of local user profiles, registering and/or de-registering to/from local networks, and the like.

Figure 3:
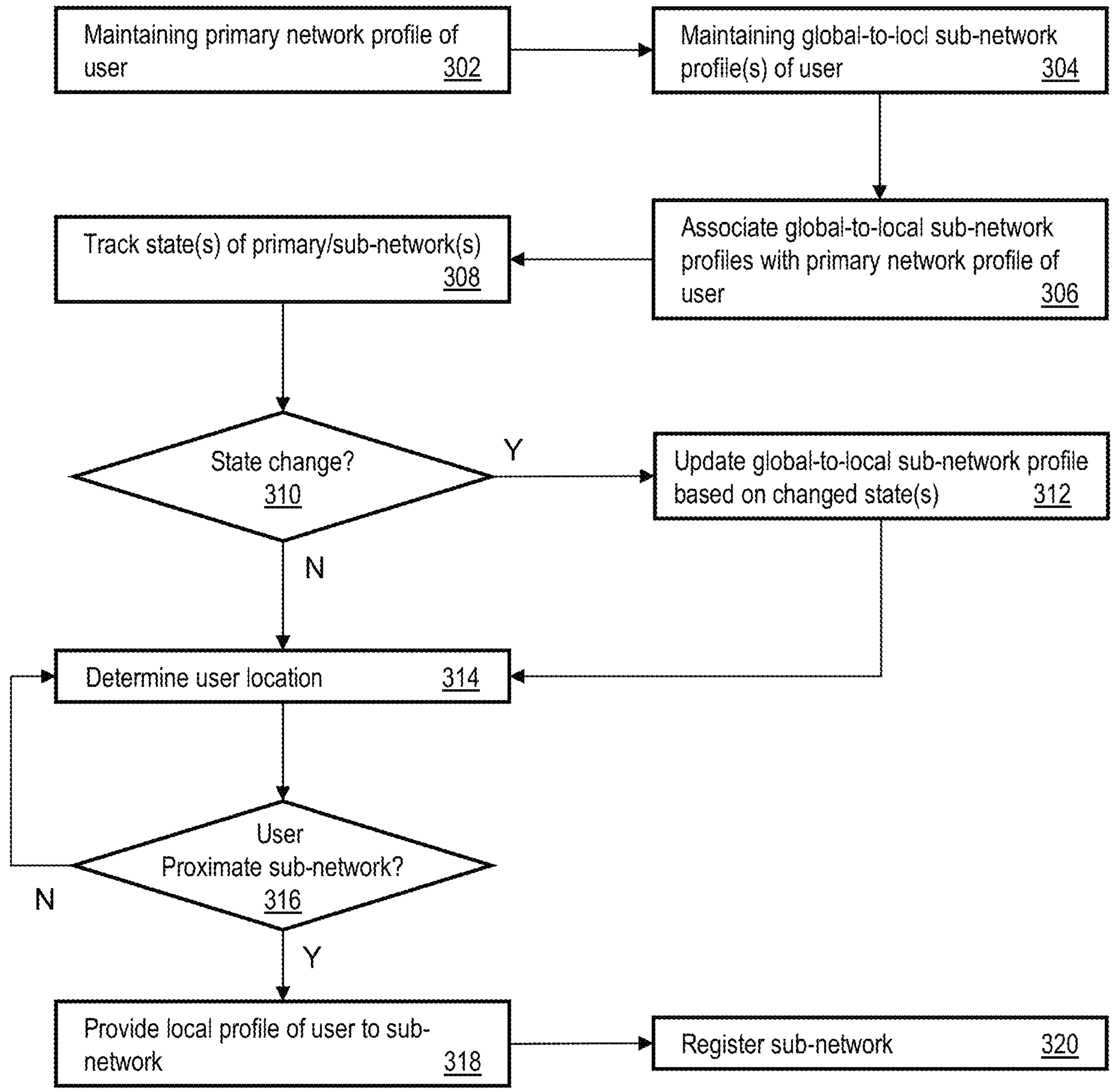
FIG. 3 depicts an illustrative embodiment of a process used in portions of the system described in FIGS. 1-2.

FIG. 3 depicts an illustrative embodiment of a process 300 used in portions of the systems 100, 200 described in FIGS. 1-2. The process 300 includes maintaining primary network profile of user at 302. The process 300 also includes maintaining a global-to-local subscriber profile at 304. The global-to-local subscriber profiles are associated with the global subscriber profile of a primary network provider at 306.

In at least some embodiments, states of one or more of the primary and/or local or sub-networks are tracked or otherwise monitored. A determination as to whether a particular state has changed is accomplished at 310. To the extent that a change is determined at 310 in state is observed or otherwise detected at 308, one or more of the primary and/or global-to-local profiles are updated accordingly.

A user location is determined at 314. The user location can be determined ty any of various techniques, such as GPS location determined by user equipment and reported to one or more of the primary network and/or the local network. Cell-tower estimation of a user location based on signals obtained at one or more cell towers from user equipment, such as a mobile phone or tablet device. The foregoing examples can be considered determinations of actual locations based on location data obtained from user equipment. It is understood that in in at least some embodiments, the users location can be determined or otherwise estimated by other techniques, such as a user's calendar and/or schedule, historical patterns observed for the particular user based on one or more of times of day, day of week and/or events. In some applications a machine learning can be applied to observed location data and/or local/global network usage patterns. Estimates as to locations can be predicted and subsequently validated or disqualified by subsequent measurements. Artificial intelligence can improve estimates as greater numbers of patterns of activity are observed.

A determination is made at 316 as to whether the user is proximate to one or more local and/or sub networks. To the extent that the user is not proximate to any particular local/sub network, the user's location is subsequently determined at 314 and the process continues form there. However, to the extent that a determination is made at 316 that the user is proximate to a particular local/sub network, information based on a corresponding global-to-local subscriber profile is provided from the service provider to the local/sub network at 318. For example, this information can be used to update a local subscriber profile maintained by the local/sub network.

In some embodiments a proximity of the subscribing user to a first local network is calculated by identifying a location of the first local network, calculating a distance between the location of the user to the location of the first local network and comparing the distance to a distance threshold, wherein a distance less than the distance threshold indicates a proximate relationship between the user and the first local network. In at least some applications, the subscriber can be registered in the local/sub network based on the information provided by the global-to-local profile. For example, the user can be registered within the first local network based on a comparison of the distance to the distance threshold indicating that the distance is less than the distance threshold and a determination that the user is not currently registered with the first local network. In at least some embodiments, the user is de-registered within the first local network based on the comparison of the distance to the distance threshold indicating that the distance is greater than the distance threshold and a determination that the subscribing user is currently registered with the first local network.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In some embodiments, a personal hotspot, profile authentication function and/or service is provided. For example, each time a personal hotspot, such as a user's mobile phone and/or car, approaches a hosting access point, such as the user's home, the personal hotspot receives broadcast SSID from the hosting access point. The personal hotspot can compare the broadcast SSID to predefined common SSID with the MAC address of the hosting access point. If the broadcast SSID match with the predefined common SSID, the personal hotspot can send a request to a consolidated network repository (CNR), e.g., the CNR 208 of the mobility network 206 (FIG. 2) in order to retrieve predefined access criteria, such as a Wi-Fi Protected Access 2 (WPA-2) pre-shared key entered by hosting access point. Details of example CNRs are disclosed in U.S. Pat. No. 9,058,369, incorporated herein by reference in its entirety. The personal hotspot can use the security phrase obtained from the CNR profile to connect to the host access point, e.g., as a bridge connection. Consequently, the personal hotspot can obtain an IP address from the same subnet as the host access point, which can be preset as an initial configuration of the distribution subsystem.

In other embodiments, a home network, profile authentication function and/or service is provided. For example, a home network 104*a* (FIG. 2) is configured to contain a subscriber profile database. This local database can include a local profile 118*a* (FIG. 2) of a particular subscriber. In at least some embodiments, the home network includes one or more sub networks, e.g., personal hotspots, cars 104*c* (FIG. 2). A new sub network, e.g., a car, approaches the home network 104*a*, entering into a garage of the home. The new subnetwork 104*c* can send a request to the home network 104*a* for authentication. The home network, e.g., in response to the request, queries a subscriber profile database. A subscriber profile database supports an authentication procedure to establish the new network 104*c* as a sub-network of the home network 104*a*. The new sub network 104*c* is authenticated, having been determined to belong to a valid user by way of the subscriber database. Based upon a successful authentication, the new sub network 104*c* is ready to exchange data and service with the home network 104*a*.

In at least some embodiments, an existing sub network, such as the authenticated car network 104*c* of the preceding example can be disengaged from the home network responsive to the car leaving a coverage area of the home network. For example, as a user drives away from their home, the home network disengages the subnetwork of the car from the home network. Continuing with the example, the existing network 104*c* send request to the home network 104*a* to disengage. The home network 104*a* queries a subscriber profile database. The subscriber profile database performs a de-authentication procedure. Consequently, the subscriber database de-authenticates the existing sub network 104*c* belong to a valid user.

The foregoing examples of authentication and/or de-authentication of a subnetwork, such as a user's car, their mobile device, and the like from a home network can be accomplished for virtually any other network, such as an enterprise network. Thus, as a user approaches their workplace, an authentication procedure is initiated by the workplace network responsive to a request from the user equipment. The workplace, e.g., enterprise, network can query a subscriber profile database to obtain or otherwise verify that the request is supported by proper and sufficient access and/or authentication credentials, e.g., obtained by way of the subscriber profile. Once authenticated or otherwise registered, the user equipment is read to exchange data and/or services with the enterprise network.

In at least some embodiments, global-to-local profiles support network self-authentication. By way of illustrative example, a global network 102 (FIG. 1) contains a global subscriber profile database, e.g., within a CNR 114 (FIG. 1). The global network contains multiple sub network, e.g., home network 104*a*, enterprise network 104*b*, travel network 104*c*, e.g., as in a user's car, a bus or train. The global network 102 also includes a global subscriber profile database, e.g., CNR 114 that contains subscriber credential information. In at least some embodiments, the CNR can include subscriber credential information for all subscribers in each of the different sub-networks.

By way of illustrative example, a car sub network 104*c* is approaching an enterprise sub network 104*b* and/or a home sub network 104*a*. The employee can be entering the office building and/or the user's car entering a home garage. The sub network 104*b*, 104*a* send a request to the enterprise local network 104*b* and/or home local network 104*a* for authentication. The enterprise and/or home networks 104*b*, 104*a* look up in their respective local subscriber profile databases to identify credentials of the subscriber. To the extent that credentials are not available, the enterprise and/or home network local networks, e.g., via their local subscriber profile databases, issue a query to a local sub-network gateway. The enterprise and/or home sub-network gateway forwards the query to a global network subscriber profile management system 112, e.g., to the global network subscriber profile database 114. The global network subscriber profile system, e.g., database, performs an authentication procedure for the inquiring sub network, e.g., the subscriber's car. The global network subscriber profile database authenticates the new sub-network having determined that it belongs to a valid user. It is understood that in at least some applications additional requirements, restrictions and/or rules can be applied in association with one or more of the requesting and/or granting of such authentication requests.

The global network subscriber profile system and/or database authenticates the new sub-network and confirms that it is belongs to a valid user having a profile with sufficient authentication credentials within its database. The global network subscriber profile system and/or database produces credential information for the particular sub-network. The global network subscriber profile system and/or database sends the credential information to the corresponding local sub-network profile database, e.g., via the local network gateway. The local sub-network profile database stores the credential information for the particular sub-network. The local sub-network profile database authenticates the sub-network on behalf of the global network profile database. The new sub network is ready to exchange data and service with the enterprise and/or home network.

Figure 4:
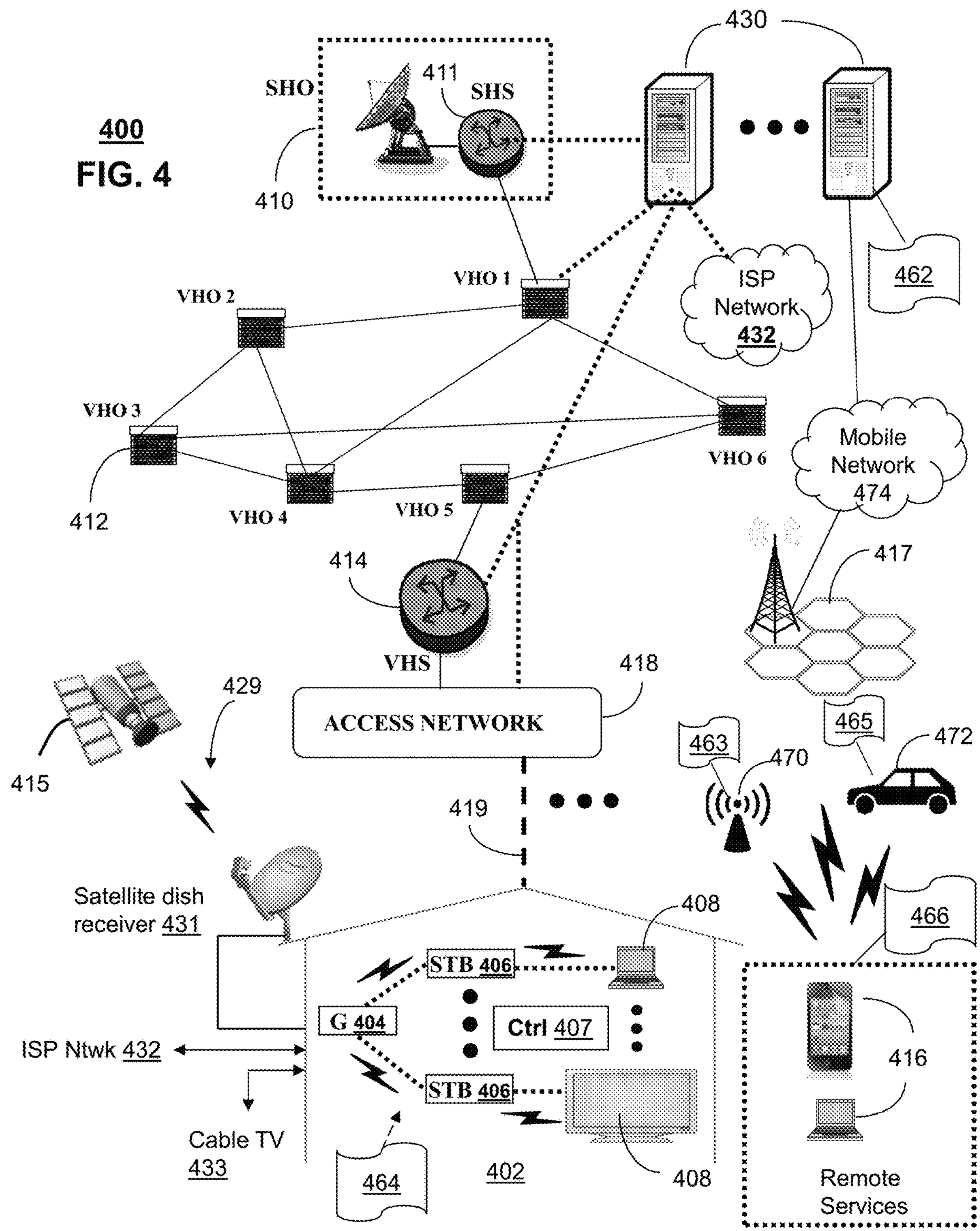
FIGS. 4-5 depict illustrative embodiments of communication systems that provide media services with a profile control according to the systems of FIGS. 1-2 and the process of FIG. 3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with either of the communication systems 100, 200 of FIGS. 1 and/or 2 as another representative embodiment of communication system 400. For instance, one or more devices illustrated in the communication system 400 of FIG. 4 associate a global-to-local network profile with a user profile of a first communications network and detect a local network managed separately from the first communications network. The local networks include local user profiles, wherein access to resources of a local network is based on credentials available by way of a local user profile associated with the user. A location of the user is determined and a proximity of the user to a first local network is determined based on the location of the user. Information is transferred between the global-to-local network profile and a local user profile based on the proximity of the user to the first local network, wherein the transferring of the information supports a registration status of the user, e.g., allowing the user to be registered and/or de-registered with the first local network.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a profile controller or profile server (herein referred to as profile controller 430). The profile controller 430 can use computing and communication technology to perform function 462, which can include among other things, one or more of the various the profile coordination techniques described herein, e.g., according to the process 300 of FIG. 3. For instance, the function 462 of profile controller 430 can be similar to the functions described for the profile controller 116 of FIG. 1, the management function 242 and/or the local management functions 272 of FIG. 2, e.g., in accordance with the process 300 of FIG. 3. The media processors 406, and/or the residential gateway 404 and wireless communication devices 416 can be provisioned with software functions 464 and 466, respectively, to utilize the services of the profile controller 430. Similarly, one or more of the wireless access point 470 and the car 472 can be provisioned with software functions 463 and 465 respectively, to utilize the service of the profile controller 430. For instance, functions 464 and 466 of the media processors 406 and wireless the communication devices 416 can be similar to the functions described for the communication devices 108, the local networks 104 of FIG. 1 in accordance with the process 300 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
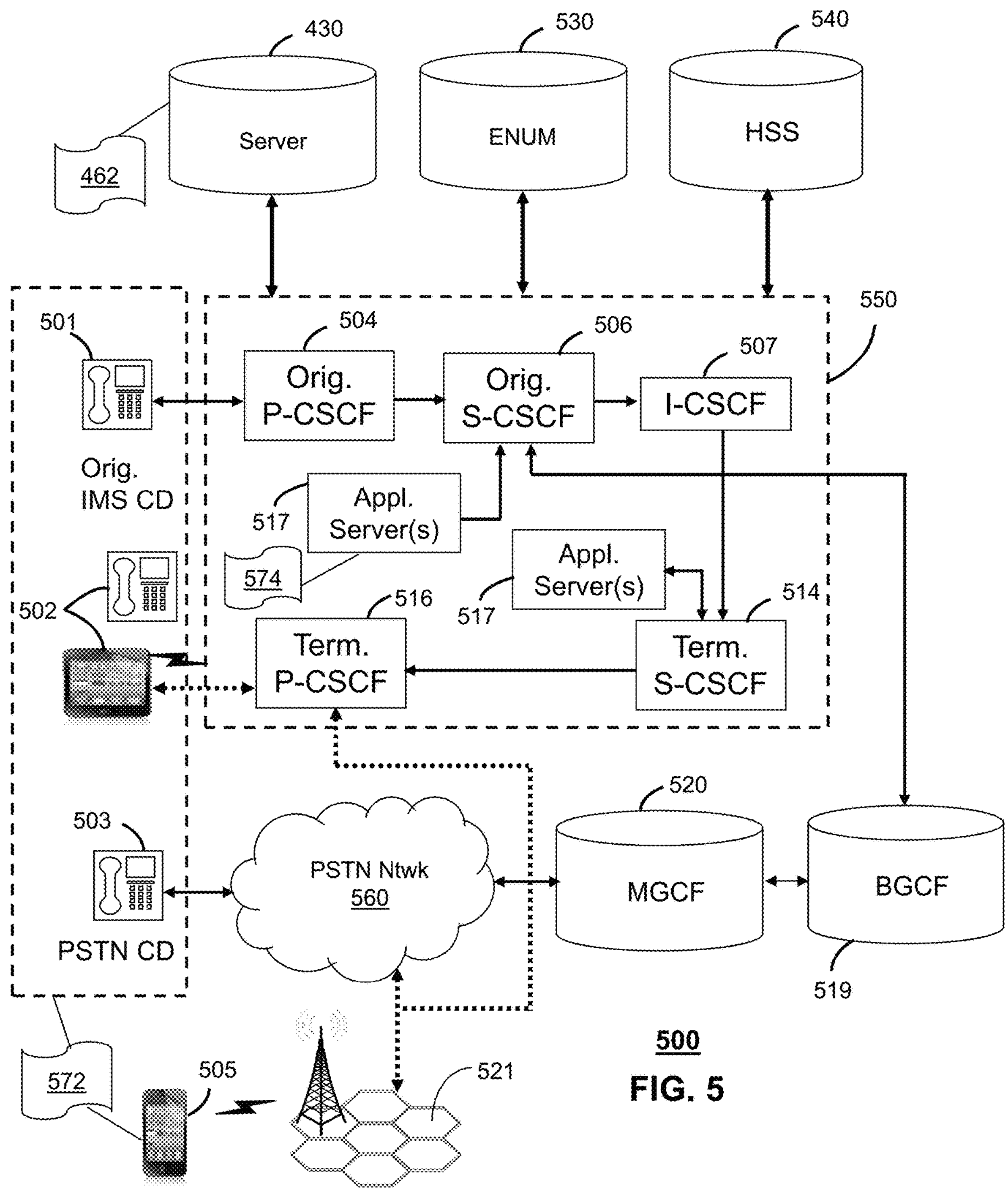

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with either of the communication systems 100, 200 of FIGS. 1 and/or 2 and/or communication system 400 of FIG. 4, as another representative embodiment of the communication system 500. A global-to-local network profile is associated with a user profile of a first communications network and detect a local network managed separately from the first communications network. The local networks include local user profiles, wherein access to resources of a local network is based on credentials available by way of a local user profile associated with the user. A location of the user is determined and a proximity of the user to a first local network is determined based on the location of the user. Information is transferred between the global-to-local network profile and a local user profile based on the proximity of the user to the first local network, wherein the transferring of the information supports a registration status of the user, e.g., allowing the user to be registered and/or de-registered with the first local network.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (aSs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances, the aforementioned communication process is symmetrical. Accordingly, the terms “originating” and “terminating” in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The profile processor 430 of FIG. 4 can be operably coupled to communication system 500 for purposes similar to those described above. The profile processor 430 can perform function 462 and thereby provide global-to-local profile management services to the CDs 501, 502, 503 and 505 of FIG. 5, similar to the functions described for the profile processor 116 of FIG. 1, and in accordance with the process 300 of FIG. 3. The CDs 501, 502, 503 and 505, which can be adapted with software to perform function 572 to utilize the services of the profile processor 430, similar to the functions described for communication devices 108 of FIGS. 1, and 416 of FIG. 4, in accordance with the process 300 of FIG. 3. The profile processor 430 can be an integral part of the application server(s) 517 performing function

574, which can be substantially similar to functions 463-466 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
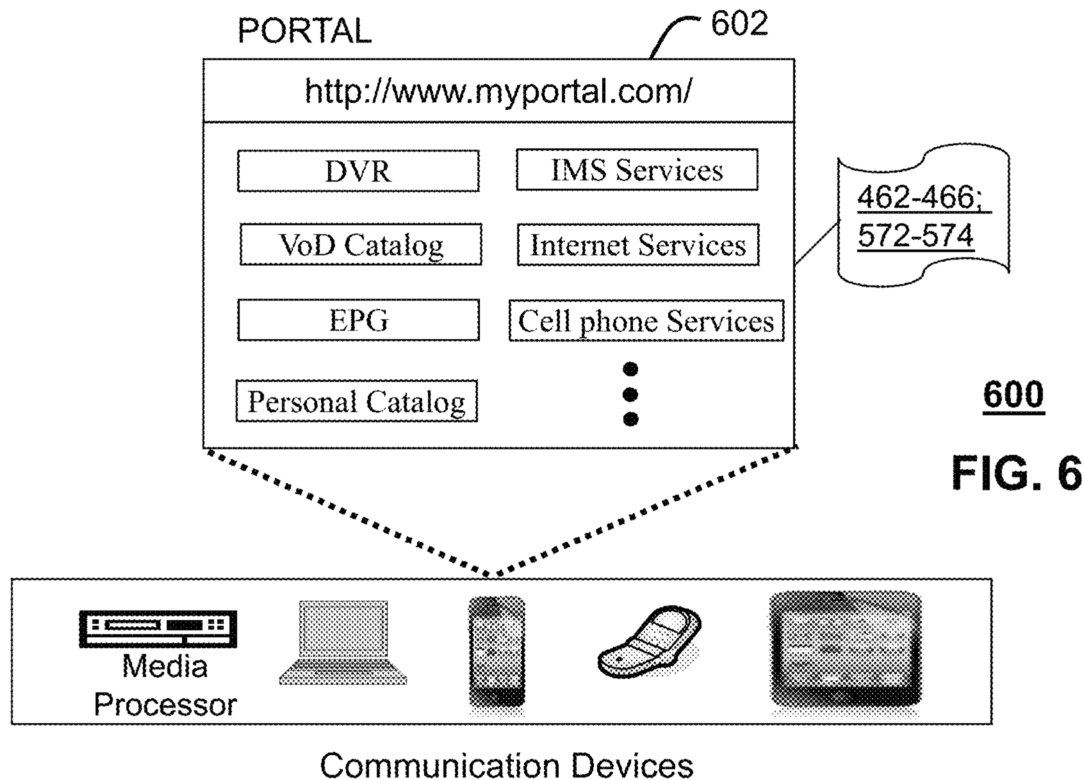
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with either of the communication systems 100, 200 of FIGS. 1 and/or 2, communication system 400 of FIG. 4, and/or communication system 500 of FIG. 5, as another representative embodiment of the communication systems 100, 200, 400, and/or 500. The web portal 602 can be used for managing services of systems 100, 200, 400 and/or 500 of FIGS. 1, 2, 4 and/or 5. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-573 to adapt these applications as may be desired by subscribers and/or service providers of systems 100, 200 of FIGS. 1 and/or 2, and communication systems 400-500. For instance, users of the services provided by profile processor or server 430 can log into their on-line accounts and provision the servers 116 or server 430 with any of a number of feature that a user may want to program such as user profiles, authentication credentials, identification of local networks, and to provide contact information to server to enable it to communication with devices described in FIGS. 1-5, and so on. Service providers can log onto an administrator account to provision, monitor and/or maintain the systems 100-200 of FIGS. 1 and/or 2 and/or the profile processor 430.

Figure 7:
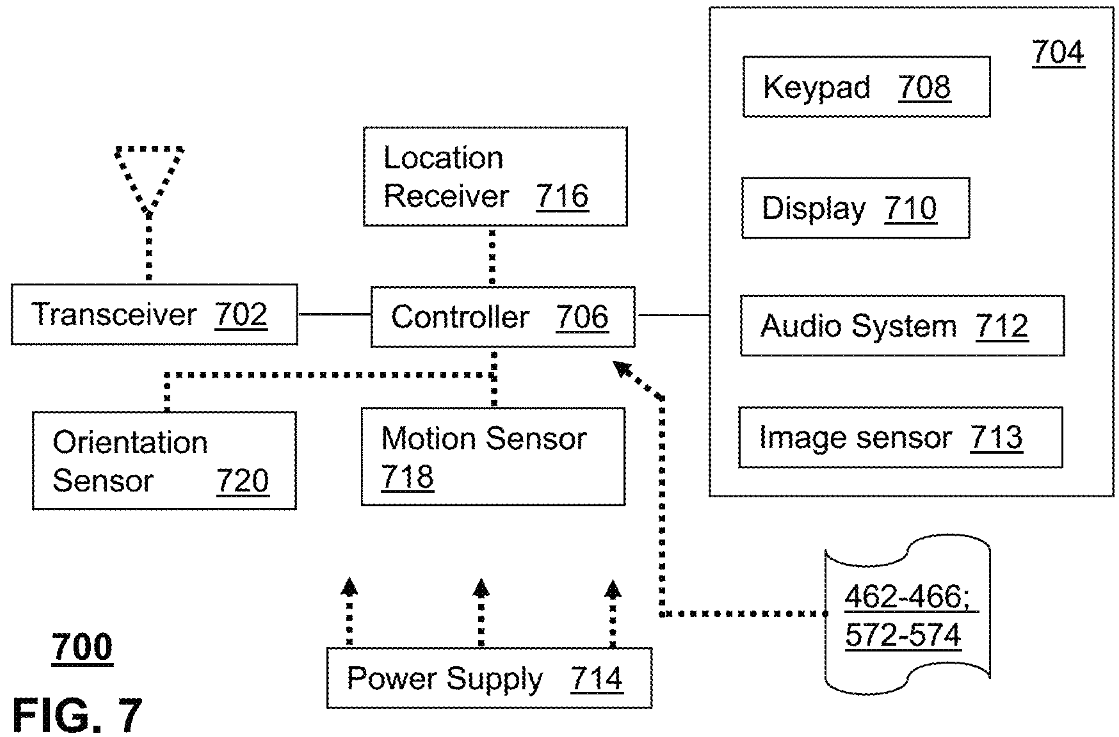
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5 and can be configured to perform portions of the process 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of one or more of the devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 of FIGS. 1 and/or 2, communication systems 400-500 of FIGS. 4-5 such as a gaming console and a media player. In addition, the controller 706 can be adapted in various embodiments to perform the functions 462-466 and/or 572-574, respectively.

A global-to-local profile controller system, such as the examples disclosed herein, allows a service provider network, such as a mobile LTE service provider network, to promptly engage with the local networks and to gain visibility of the subscriber's behavior and activity at or within the local networks. Accordingly, the LTE network is able to deliver a wide range of products and services when the subscriber is within a service area of the service provider's networks, and/or within one of a number of local networks. The global-to-local profile controller system can facilitate access to local networks and/or applications and/or services based on the user entering into a local network, moving into another local network, exiting the local network, joining multiple local networks and/or exiting multiple local networks.

Upon reviewing the aforementioned embodiments, it would be evident to an artisan with ordinary skill in the art that said embodiments can be modified, reduced, or enhanced without departing from the scope of the claims described below. For example, the system can update or otherwise maintain one or more of a subscriber global-to-local profile and/or associated state tracking of a user active in more than one local network. Such active status and/or state tracking can be used to synchronize services, to anticipate handovers, e.g., establishing communications, channels and the like, caching and/or clearing of cached date, and the like. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
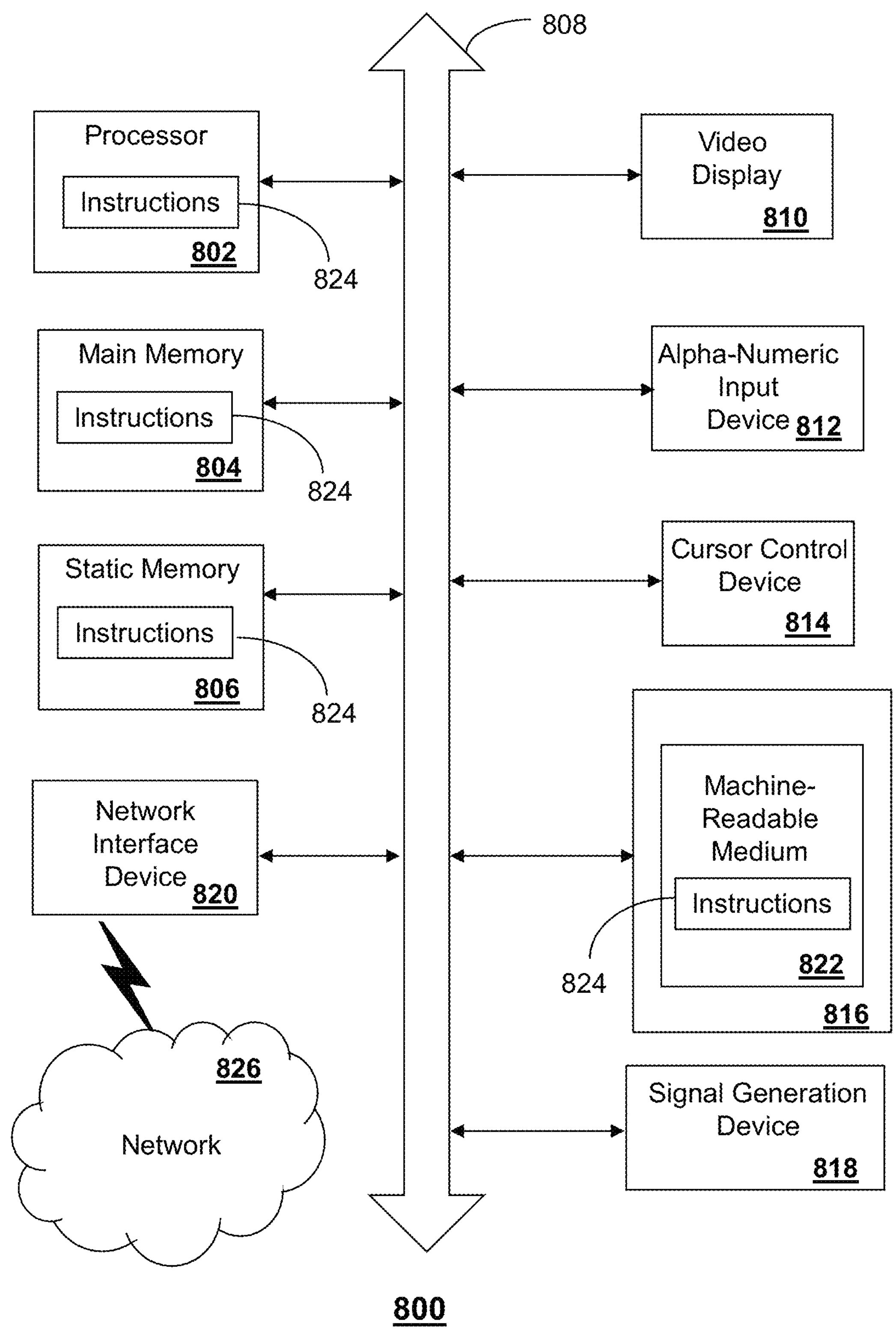
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the profile processor 430, the media processor 406 the profile controller 116, the customer profile repository 114, the subscriber global-to-local profile repository 118, devices of any of the local networks, machines in any machine-to-machine communications, e.g., according to IoT applications, and other devices of FIGS. 1-2 and 4-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device, comprising:

a processing system including a processor; and a memory that stores executable instructions that, when executed by the processing system, facilitate performance of operations, the operations comprising:

associating a plurality of global-to-local network profiles with a subscribing user of a mobile cellular network, wherein a service provider of the mobile cellular network maintains a global subscriber profile for the subscribing user;

maintaining within the global subscriber profile, the plurality of global-to-local network profiles, wherein the plurality of global-to-local network profiles are associated with a plurality of wireless local area networks managed separately from the mobile cellular network, wherein access to resources of the plurality of wireless local area networks by equipment of the subscribing user is based on credentials obtained by way of the plurality of global-to-local network profiles;

identifying a location of the subscribing user; and based on location of the subscribing user, exchanging information between a first global-to-local network profile of the plurality of global-to-local network profiles and a local subscriber profile maintained by a first wireless local area network, wherein the exchanging of the information supports a registration status of the subscribing user with a wireless access point of the first wireless local area network;

determining that the subscribing user is currently registered with the first wireless local area network; and initiating a de-registration of the subscribing user within the first wireless local area network of the plurality of wireless local area networks responsive to a determination of a change of the location of the user.

2. The device of claim 1, wherein the identifying the location of the subscribing user further comprises detecting a self-reported location of the equipment of the subscribing user.

3. The device of claim 1, wherein the identifying the location of the subscribing user further comprises estimating the location of the subscribing user based on one of a schedule of the subscribing user, a historical record of network activity of the subscribing user, a historical record of locations of the subscribing user, or any combination thereof.

4. The device of claim 1, further comprising:

identifying a location of the first wireless local area network;

calculating a distance between the location of the subscribing user and the location of the first wireless local area network; and comparing the distance to a distance threshold, wherein the initiating a de-registration of the subscribing user within the first wireless local area network is responsive to the comparing.

5. The device of claim 4, wherein the operations further comprise:

determining that the subscribing user is not currently registered with the first wireless local area network; and accessing information of the local subscriber profile to facilitate a registration of the subscribing user within the first wireless local area network responsive to the comparing and the determining that the subscribing user is not currently registered.

6. The device of claim 4, wherein the operations further comprise:

performing a pre-registration of the subscribing user a second wireless local area network of the plurality of wireless local area networks; and initiating the de-registration of the subscribing user within the first wireless local area network responsive to performing the pre-registering and responsive to the distance being greater than the distance threshold and the determining that the subscribing user is currently registered.

7. The device of claim 1, wherein the first wireless local area network comprises an enterprise network, wherein the exchanging of the information between the first global-to-local network profile and the local subscriber profile further comprises providing the first global-to-local network profile to the first wireless local area network, and wherein the local subscriber profile maintained by the enterprise network is updated based on the first global-to-local network profile.

8. A method, comprising:

associating, by a processing system including a processor, a plurality of global-to-local network profiles with a subscribing user of a mobile cellular network;

maintaining, by the processing system, the plurality of global-to-local network profiles within a subscriber profile of the subscribing user, wherein respective global-to-local network profiles of the plurality of global-to-local network profiles are associated with respective wireless local area networks of a plurality of wireless local area networks managed separately from the mobile cellular network, wherein access to resources of the respective wireless local area networks by equipment of the subscribing user is based on credentials available by way of the plurality of global-to-local network profiles;

determining, by the processing system, a location of the subscribing user;

based on the location of the subscribing user, transferring, by the processing system, information between a first global-to-local network profile of the plurality of global-to-local network profiles and a local subscriber profile maintained by the a first wireless local area network, wherein the transferring of the information supports a registration status of the subscribing user with the first wireless local area network; and if the subscribing user is currently registered with the first wireless local area network, initiating a de-registration of the subscribing user within the first wireless local area network of the plurality of wireless local area networks responsive to a determination of a change of the location of the user.

9. The method of claim 8, wherein the determining of the location of the subscribing user further comprises determining, by the processing system, a self-reported location of the equipment of the subscribing user.

10. The method of claim 8, wherein the determining of the location of the subscribing user further comprises estimating, by the processing system, the location of the subscribing user based on one of a schedule of the subscribing user, a historical record of network activity of the subscribing user, a historical records of locations of the subscribing user, or any combination thereof.

11. The method of claim 8, wherein the transferring of the information between the first global-to-local network profile and the local subscriber profile further comprises providing, by the processing system, the first global-to-local network profile to the first wireless local area network, wherein the local subscriber profile is associated with the subscribing user and is updated based on the first global-to-local network profile.

12. The method of claim 8, further comprising:

determining, by the processing system, a location of the first wireless local area network;

determining, by the processing system, a distance between the location of the subscribing user and the location of the first wireless local area network; and comparing, by the processing system, the distance to a distance threshold, wherein the initiating a de-registration of the subscribing user within the first wireless local area network is responsive to the comparing.

13. The method of claim 12, further comprising:

if the subscribing user is not currently registered with the first wireless local area network, accessing information, by the processing system, of the local subscriber profile to facilitate a registration of the subscribing user within the first wireless local area network.

14. The method of claim 12, further comprising:

performing, by the processing system, a pre-registration of the subscribing user with a second wireless local area network of the plurality of wireless local area networks; and initiating the de-registration of the subscribing user within the first wireless local area network responsive to performing the pre-registering and responsive to the distance being greater than the distance threshold and the determining that the subscribing user is currently registered.

15. A non-transitory, machine-readable storage medium, comprising executable instructions that, when executed by a processing system including a processor, facilitate performance of operations, comprising:

maintaining, within a user profile of a user of a mobile cellular network, a plurality of global-to-local network profiles, wherein each global-to-local network profile is associated with the user, wherein the plurality of global-to-local network profiles are respectively associated with a plurality of wireless local area networks managed separately from the mobile cellular network, wherein access to resources of the plurality of wireless local area networks by equipment of the user is based on credentials obtained by way of the plurality of global-to-local network profiles;

determining a location of the user; and based on the location of the user, transferring information between a first global-to-local network profile of the plurality of global-to-local network profiles and a local user profile maintained by a first wireless local area network, wherein the transferring of the information supports a registration status of the user with the first wireless local area network;

determining that the user is currently registered with the first wireless local area network of the plurality of wireless local area networks; and initiating a de-registration of the user within the first wireless local area network responsive to a determination of a change of the location of the user.

16. The non-transitory, machine-readable storage medium of claim 15, wherein the transferring of the information between the first global-to-local network profile and the local user profile further comprises providing the first global-to-local network profile to the first wireless local area network, and wherein the local user profile maintained by the first wireless local area network is updated based on the first global-to-local network profile.

17. The non-transitory, machine-readable storage medium of claim 16, wherein the determining of the location of the user further comprises determining a self-reported location of the equipment of the user.

18. The non-transitory, machine-readable storage medium of claim 15, further comprising:

determining a location of the first wireless local area network of the plurality of wireless local area networks;

determining a distance between the location of the user and the location of the first wireless local area network of the plurality of wireless local area networks; and comparing the distance to a distance threshold, wherein a distance less than the distance threshold indicates a proximate relationship between the user and the first wireless local area network, wherein the proximate relationship defines the change of the location of the user.

19. The non-transitory, machine-readable storage medium of claim 18, wherein the operations further comprise:

determining that the user is not currently registered with the first wireless local area network of the plurality of wireless local area networks; and accessing information of the local user profile to facilitate registration of the user within the first wireless local area network responsive to the proximate relationship and the determining that the user is not currently registered.

20. The non-transitory, machine-readable storage medium of claim 18, wherein the operations further comprise:

performing a pre-registration of the user with a second wireless local area network of the plurality of wireless local area networks; and initiating the de-registration of the user within the first wireless local area network of the plurality of wireless local area networks responsive to the performing the pre-registering and responsive to the distance being greater than the distance threshold and the determining that the user is currently registered.

* * * * *

UNITED STATES PATENT AND TRADEMARK OFFICE

CERTIFICATE OF CORRECTION

PATENT NO. : 10,674,347 B2
APPLICATION NO. : 16/573241
DATED : June 2, 2020
INVENTOR(S) : Sangar Dowlatkhah, Venson Shaw and Richard Schmidt It is certified that error appears in the above-identified patent and that said Letters Patent is hereby corrected as shown below:

In the Claims

Column 25, Line 51:
Delete "profile maintained by the a first wireless local area"
And insert --profile maintained by a first wireless local area--

Signed and Sealed this
Fifth Day of September, 2023

Katherine Kelly Vidal

Katherine Kelly Vidal
*Director of the United States Patent and Trademark Office*